March 25, 1947. R. G. JEWELL 2,418,032
ERECTING DEVICE FOR GYROSCOPES
Filed Dec. 12, 1942 2 Sheets-Sheet 1
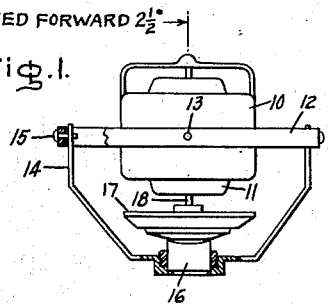
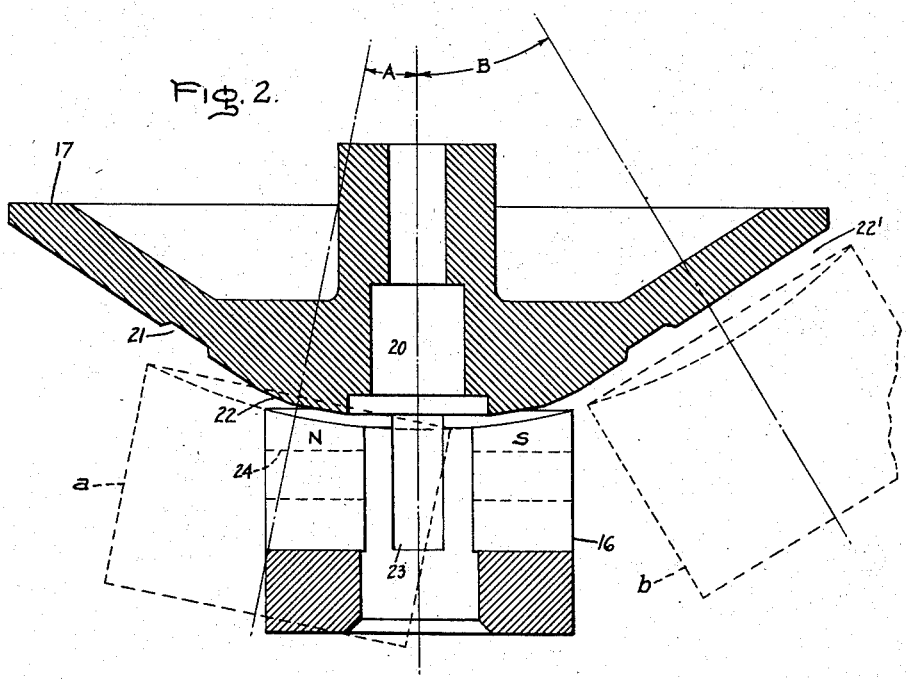
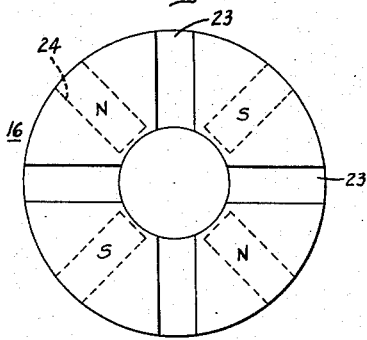
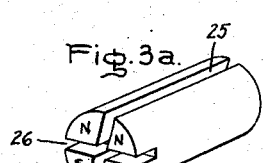
Inventor:
Richard G. Jewell,
by Harry E. Dunham
His Attorney.

March 25, 1947.  R. G. JEWELL  2,418,032
ERECTING DEVICE FOR GYROSCOPES
Filed Dec. 12, 1942  2 Sheets-Sheet 2
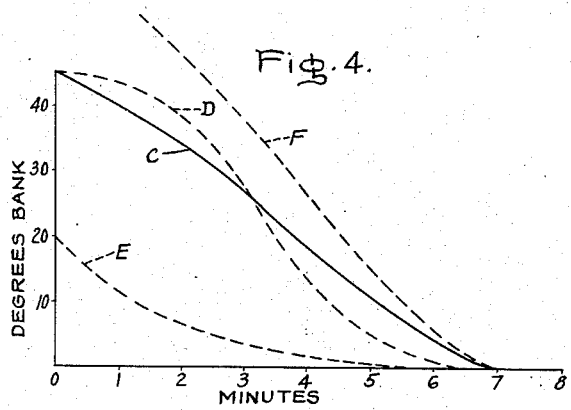
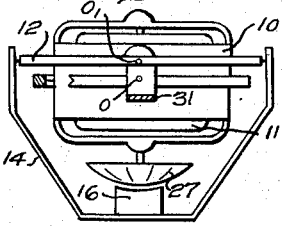
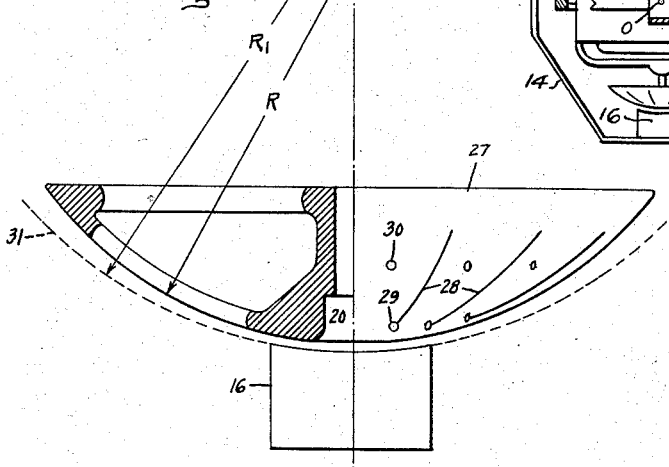
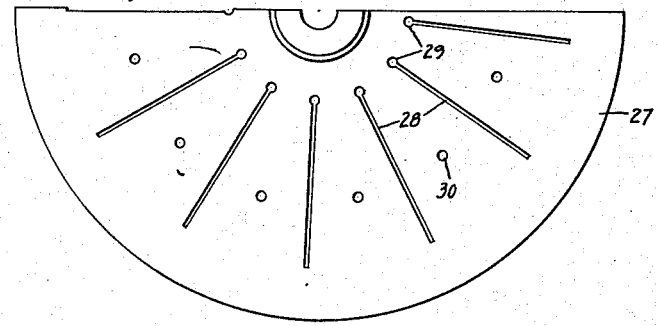
Inventor:
Richard G. Jewell,
by Harry E. Dunham
His Attorney.

Patented Mar. 25, 1947

2,418,032

UNITED STATES PATENT OFFICE 2,418,032

ERECTING DEVICE FOR GYROSCOPES

Richard G. Jewell, Swampscott, Mass., assignor to General Electric Company, a corporation of New York Application December 12, 1942, Serial No. 468,859

12 Claims. (Cl. 74—5)

My invention relates to erecting devices for gyroscopes of the vertical spin axis type, and one object is to provide an eddy current type of erecting device which has an erecting rate at different erecting angles which is more nearly constant than is obtained by such erecting devices of the prior art. Other objects of my invention will appear as the description proceeds.

It is desirable to have the erecting rate on artificial horizon gyroscopes used on airplanes constant for the angles of bank normally used for "instrument" turns. This is so because during a turn the pendulous erecting magnet swings out to a position determined by the resultant of the force of gravity vector and the centrifugal force vector. This resultant vector is ordinarily perpendicular to the plane of the airplane since the pilot must bank the plane to this position to prevent side slip. For a slow speed airplane this angle might be as small as 10 degrees, whereas for a high speed plane it will increase to 40 degrees for a 180 degree per minute rate of turn. The fact that the erecting magnet swings off vertical to the extent of 10 degrees to 40 degrees ordinarily causes the gyroscope to precess off the true vertical during the turn. The amount of this error depends upon the length of time it takes to make the turn and upon the erecting rate. Now it so happens that by inclining the axis of the gyroscope forward by the right amount, which depends upon the erecting rate, this error can be compensated. For instance, for a 180 degree per minute turn and with an erecting rate of eight degrees per minute the vertical axis of the gyroscope should be inclined forward two and one-half degrees. This compensation is independent of the angle of bank but requires that the erecting rate be predetermined and constant for different angles of bank.

My invention relates to an erecting device which is designed to produce the correct and substantially constant rate of erection over the usual range of deflection from the vertical met with in practice.

The features of the invention which are believed to be novel and patentable will be pointed out in the claims appended hereto. For a better understanding of my invention reference is made in the following description to the accompanying drawing in which Fig. 1 represents portions of a gyroscope instrument of the general character to which my invention is applicable and the relation of my improved erecting device thereto. Fig. 2 is a sectional view of the rotary conductor and stationary magnet of an eddy current erecting device embodying my invention. Fig. 3 is a plan view of a magnet such as is used in Fig. 2; Fig. 3a shows a magnetic adjusting plug which is preferably made a part of the magnet of Fig. 3; Fig. 4 shows rate of erection curves explanatory of my invention; Figs. 5 and 6 show partial side and plan views of a modified erecting conductor member embodying my invention; and Fig. 5a indicates the construction of a gyroscope having a pendulous erecting device pivoted above the universal pivot point of the gyroscope.

Referring now to Fig. 1, 10 represents a gyroscope casing and 11 its rotor. These may comprise the stator and rotor of an electric motor but this is immaterial to my invention. The gimbal ring support for the gyroscope is not shown, but the gyroscope is of the vertical spin axis universally mounted type. 12 represents a gimbal ring pivoted to the gyroscope on one horizontal axis 13, and 14 represents a bail pivoted on a horizontal axis 15 to gimbal ring 12 at right angles to the first mentioned axis 13. The gimbal ring 12 and bail 14 form a universal pendulum support for the pendulous magnet 16 of the gyroscope erecting apparatus. The pivot points for pendulum and gyroscope may but do not necessarily coincide. The magnet 16 produces a flux in a conductor member 17 generally in the shape of an inverted truncated cone which is symmetrical with the spin axis of the gyroscope and is rotated through a shaft 18 connected to the gyroscope rotor. The magnet 16 and rotor conductor 17 form an eddy current erecting device the purpose of which is to maintain the spin axis of the gyroscope vertical less the small angle of forward inclination required for compensation if compensation is included.

In an erecting device of this character there is no precessing force when the magnet is in its position of rest centered symmetrically with the axis of rotation of the conductor 17, although an eddy current damping force exists. Heretofore so far as I am aware the lower surface of the conductor 17 has been continuous and spherical. When the pendulous magnet swings away from the vertical such a spherical surfaced conductor does not produce a constant rate of erection for different erection angles for reasons that will become apparent. As shown more in detail in Fig. 2, I employ a conductor 17 which does not have a lower spherical surface and departs from a spherical surface in several respects. The design illustrated when used with the type of magnet to be described produces a substantially constant rate of erection over a 45 degree airplane banking angle range in either direction. The erecting magnet shown is a permanent magnet having four nearly triangular shaped poles arranged in a circle, each occupying one quadrant and with alternate poles of opposite polarity, as best shown in the plan view of Fig. 3. This is formed by grinding, machining, or casting slots 23 in a hollow cylindrical structure, the slots being at right angles to each other parallel to the axis of the cylinder and through its center about two-thirds the length of the cylinder and the resulting alternate poles polarized as represented. The pole faces are ground to a common spherical surface such that the top of the magnet considered as a whole is slightly hollowed out as represented. The magnet is preferably adjustable in its ball support towards and away from conductors 17 as indicated in Fig. 1.

The conductor member 17 has a central axial opening at 20, and a recess 21 cut out of its lower surface concentric to central opening 20 and the lower surface is otherwise shaped as shown.

As previously mentioned there is no erecting or precessing force when the magnet and rotating conductor are centered, as shown in full lines in Fig. 2, because the eddy current drag force on one side of the axis is equal and opposite to that diametrically opposite. When the magnet swings slightly away from its normal position of rest at the center, these forces become unbalanced since that part of the magnet farthest from center is opposite a faster rotating part of the surface of the conductor and the eddy current drag force produced at any given point is proportional to the flux cutting the conductor times the rate of cutting. In an erecting device having no central opening 20 in the conductor, this unbalance and the precessing force rise very gradually. In my device when the magnet starts to swing off center, that part of the magnet nearest the axis of the conductor 17 moves under the opening 20 where there is no conductor material to be cut by the flux of that part of the magnet while the diametrically opposite part of the magnet moves under the bulging or protruding part 22 of the conductor. Hence the unbalancing of the eddy current drag forces on opposite sides of the axis of the rotating conductor 17 and hence the precessing force rises much more rapidly. Aside from any other consideration, this is very desirable because assuming the axis of the gyroscope shifted off center instead of the magnet, we have an increased erecting force at small erroneous positions of the gyroscope axis for erection purposes, which decreases the wandering of the gyroscope from correct position. That is, we have an erecting device which is much more effective than heretofore for small erecting angles.

When the magnet 16 swings farther from center, for example, as represented by the bank angle A and dotted line magnet position a, Fig. 2, the flux from the right-hand poles of the magnet starts to cut the conductor surface to the left of its center axis while the left-hand edge of the magnet has moved adjacent a still faster rotating part of the conductor. In an erecting device having the usual unbroken spherical surface, this results in an abrupt rise in the precessing force since now the drag forces produced by opposite halves of the magnet are to the left of the axis of the conductor and add to produce the precessing force. Such abrupt rise in the precessing force is avoided in my erecting device by reason of the shape of the conductor surface and the recess 21 therein. It is seen that in position a the left half of the magnet has largely swung away from the protruding part 22 of the conductor and is entirely opposite the cone surface area between point 22 and the outer periphery of the cup and approximately opposite the recess 21. Hence, the air gap between the left-hand portion of the magnet and the conductor has increased and less of the flux of the magnet cuts the conductor. Thus a too abrupt rise in the precessing force is avoided.

Between banking angles A and B, Fig. 2, the air gap between the magnet and cone surface of the conductor is generally quite large, thus compensating for the higher rate of flux cutting. At angle B and magnet position b, Fig. 2, the outer edge of the magnet has again started to approach the cone surface near the outer periphery of the conductor. Thus the air gap at 22', although quite large, is somewhat less than the corresponding air gap is at the outer edge of the magnet for the angle A and hence more flux is cut at this point 22. However, at this time the inner part of the magnet is opposite the recess 21 and hence the precessing force is again controlled downward. The reason for so shaping the outer cone portion of the conductor in relation to the radius of the pendulous magnet so that the air gap between the magnet and conductor decreases as the outer periphery of the conductor is approached is to prevent a too abrupt falling off of the precessing force for the maximum banking angles when the magnet has swung out still farther and part of it is outside the outer extremity of the conductor 17.

The improved results obtained are more clearly indicated by the curves of Fig. 4. Curve C, Fig. 4, was obtained by my improved erecting device on an artificial horizon gyroscope by setting the gyroscope spin axis off vertical by an angle of 45 degrees operating the gyroscope rotor at normal speed and allowing the erecting device to erect the spin axis of the gyroscope back to vertical position and plotting a curve between erecting angle and time. Thus it required approximately seven minutes to produce complete erection. The slope of the curve C at various erecting angles indicates the rate of erection at such angles. It is seen that the rate of erection was least at the extremities for large and small erection angles and was a maximum of eight degrees per minute at about 20 degrees bank. It is, however, noted that the curve approaches a straight line and that the erection rate is substantially constant. Curve D represents the kind of curve that would be obtained without the improvements, that is, with a spherical surfaced conductor. Curve D shows the weak nature of the erecting force for the minimum and maximum erecting angles and the excessive erecting force of about 12 degrees per minute in the neighborhood of 20 degrees bank.

If the erecting force be held to a desired maximum of eight degrees per minute as by increasing the air gap in an erecting device of which curve D is characteristic, the unsatisfactory and weak character of the erecting force for the smaller bank angles would show up as represented by curve E. Curves C and E have the same maximum slope corresponding to a maximum erection of eight degrees per minute. However, for an erroneous gyroscope angle of five degrees, it would require the device of curve E over three times as long to erect the gyroscope as for the device of curve C.

The permanent magnet 16 of my device is somewhat different from magnets heretofore used for this purpose, so far as I am aware and some of the improvement obtained is probably due to such magnet or, more correctly, to a magnet, the design of which is properly coordinated with the particular shape of conductor 17 employed since it is evident that a magnet which, for example, produces a larger or smaller distribution of the damping flux would require correspondingly different eddy current conductor dimensions to obtain the results desired. The major improvement is believed to be due to the shaping of the eddy current conductor surface in the manner and for the purpose heretofore explained, and which was arrived at experimentally. However, I do not wish to limit my invention to the exact shape and relative dimensions shown. For example, the use of a conductor 17 having a maximum diameter of 1.6 inches and other dimensions in the same proportion as represented in the oversized illustration, Fig. 2, has been found satisfactory. It produces a precessing force of the correct amount which is sufficiently constant for various bank angles that substantially perfect compensation for deflections of the erecting magnet pendulum due to banking may be obtained by tilting the spin axis of the gyroscope forward by two and one-half degrees. When this is done the erecting device will not change the spin axis of the gyroscope when the pendulous magnet thereof is swung out of correct erecting position due to correct banking turns of the plane on which it is mounted for turns of 180 degrees per minute.

The erecting device is, however, effective to maintain the spin axis of the gyroscope in or return it to the proper position at other times and is more effective than prior art erecting devices at the large and small erecting angles at the extremities of the erecting range.

When the axis of spin of the gyroscope is tilted for compensation purposes, it follows that the normal pendulous position of the magnet 16 should be tilted accordingly so that the magnet is centered with respect to the tilted spin axis of the gyroscope. In fact the tilt of the gyroscope spin axis is produced and maintained by the corresponding tilt of the erecting magnet pendulum.

It is seen that the substantially constant precessing force at different angles of bank or erection is obtained by varying the effective area of the flux gap as when part of the magnet is opposite the opening 20 or beyond the outer edge of the conductor and by varying the air gap distance between the conductor and magnet as when moving from the full line position of the magnet to position $a$ and beyond in Fig. 2. These variations take place automatically with changes in angular displacement between the gyroscope spin axis and the erecting magnet axis and take into consideration the shift of the magnet to and from a symmetrical balanced damping force condition, the variation in rate of cutting of the flux at different distances from the symmetrical position and the movement of a portion of the magnet beyond the outer periphery of the conductor.

The invention improves the device for erection purposes, especially at small erecting angles, whether or not compensation for banking is employed, and makes it possible to employ and take full advantage of such compensation.

In a magnet of the form and for the purpose of magnet 16, it is desirable that the four pole pieces be of uniform strength. For one reason or another a magnet of uniform strength poles is not always obtained in a magnet such as has thus far been described and I prefer to provide means for adjusting the strength of the magnet as a whole and also the relative strength of the different poles after the magnet has been completed and magnetized and is mounted in operating position on the gyroscope or other device where such adjusting feature is useful.

It will be noted that central radial bore holes 24 have been indicated by dotted lines in Figs. 2 and 3 in the four pole pieces of the magnet 16. Such bore holes are preferably some distance beneath the pole faces but nearer the pole faces than to the yoke ends of the poles. Into each of such bore holes I insert a plug such as is shown in Fig. 3a. The plugs may be slit nearly through their diameters as at 25 so as to be capable of limited resilient radial contraction and expansion. They may thus be easily inserted in the holes and yet fit tightly and resist displacement or turning. The plugs are also provided with a screw driver slot 26 in the outer ends so that they may be turned in their holes after assembly. Such plugs are made of permanent magnet material and are preferably inserted in the holes before the magnet is permanently magnetized. Then the magnet as a whole is magnetized to produce the polarity arrangement represented in Fig. 3 by the designations N and S. Each of the plugs is, of course, magnetized accordingly and best results will be obtained with the slots 25 oriented parallel with the flux axis. The magnet as thus completed may need no adjustment; however, any one or more of its poles may now be weakened as desired by turning the corresponding plug or plugs. A maximum weakening adjustment is obtained by turning a plug 180 degrees from its original position and various intermediate pole strengths are obtained by a lesser angle of turn.

The magnet as a whole may also be weakened by turning all of the plugs by the desired amount.

I have found that when a plug is first turned 180 degrees from its original position where magnetized and then turned back to such original position, it undergoes a slight knockdown in its magnetic strength. Hence, it may be desirable to knock down or stabilize all of the plugs after the initial magnetization in this way. Subsequent adjustments will then not change the magnetic strength of the plugs. Such a magnet may have its several poles exactly balanced as to magnetic strength while in test or operating position simply by the use of a small screw driver. The adjustable permanent magnet features just described are claimed in my divisional application Serial No. 641,317, filed January 15, 1946, and assigned to the same assignee as this application.

In Figs. 5 and 6, I have shown a rotating conductor member 27 which, except for the central opening 20, has a spherical surface opposite the erecting magnet 16. In this modification radial slots 28 and holes 29 and 30 are made in the surface and are of such dimensions and disposition as to diminish the eddy currents and erecting force for different angles of bank as desired. Also, the radius R of the spherical surface of conductor 27 is made less than the radius of swing $R_1$ of the pendulum magnet 16 so as to diminish the precessing force that would otherwise exist for increasing angles of bank. By use of these two expedients and with the central opening at 20 the precessing force may be made substantially constant and of a desired amount for various angles of bank.

The precessing force due to a banking operation when the magnet rather than the gyro swings away from vertical will, however, not be the same as the erecting force when the gyro itself rather than the magnet is off-position by the same angle. This is because when magnet 16 swings as a pendulum on longer radius R₁ from center 0 it recedes from conductor 27 as it approaches the periphery thereof, or in other words the air gap increases as indicated by the dotted line path of swing 31 in Fig. 5.

However, if the pendulum magnet now remains in correct position, namely that indicated in Fig. 5, and the axis of conductor 27 swings off, the air gap between magnet and conductor remains constant because now conductor 27 pivots about center 0 which is the point about which the gyroscope will be pivoted and the same as the radius of the spherical surface of 27.

This feature has important advantages on erecting devices generally, whether compensated as heretofore explained or not, because it means that the erecting force may be made considerably greater than the precessing force due to banking for the same angular difference between the axis of conductor and magnet. I may obtain the constant precessing force and banking turn compensation heretofore described and yet have a higher erecting rate, particularly at large erecting angles. Thus I may obtain a precessing force according to curve C, Fig. 4, and an erecting force according to curve F. For the same reason with an uncompensated erecting device I may have a high erecting rate when the magnet is in correct erecting position, without a corresponding high erroneous precessing or directing force when the erecting magnet swings out of correct erecting position. One construction which permits the pivot point of the gyroscope to come between the erecting magnet 16 and the pivot point of its pendulum support is shown in Fig. 5a where the gyroscope is suspended from the inside, and the pendulum parts 14, 16 from the outside of stationary supporting structure 31.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination with a gyroscope of the vertical spin axis type, an eddy current erecting device therefor comprising a conductor member symmetrically disposed with respect to the spin axis of the gyroscope and rotated by said gyroscope, said conductor having a lower surface roughly in the shape of an inverted truncated cone with a central opening in its apex on its axis of rotation, and a permanent magnet having four upwardly extending pole pieces symmetrically arranged in a circle with poles of opposite polarity alternating and supported as a universal pendulum beneath and adjacent to said conductor, said pendulous magnet having a normal position of rest symmetrical with respect to the spin axis of said gyroscope opposite the opening in the conductor and producing eddy currents in the rotating conductor closely surrounding said opening, the relative dimensions of said magnet opening and conductor being such that as the magnet is progressively displaced with respect to the spin axis the effective eddy current producing flux first increases on one side and disappears on the other side of said opening by an amount to produce substantially a desired erection rate, then decreases on the first-mentioned side as the magnet moves adjacent the faster moving cone portion of conductor to maintain the erection rate substantially constant at the desired value, the cone surface having a concentric recess therein to diminish the effective flux of the magnet at certain displacements thereof to assist in obtaining the desired erection rate.

2. An erecting device for gyroscopes comprising an eddy current conductor symmetrically disposed on the spin axis of the gyroscope and rotated thereby, a magnet supported as a universal pendulum with respect to the gyroscope so as to normally hang with its central axis in line with the spin axis of the gyroscope and conductor, said magnet facing and producing a flux symmetrical with its axis in a surface of the rotatory conductor so as to produce eddy currents therein, and an erecting force on the gyroscope when the spin axis of the gyroscope departs from correct position, said conductor having a central opening in its surface opposite the magnet dimensioned with respect to the magnet so that when there is small relative displacement between the spin axis of the conductor and central axis of the magnet, the formation of eddy currents in the conductor becomes unsymmetrical with respect to the magnet due to such opening being in the path of the flux from one side of the magnet whereby the precessing force for such small relative displacements is increased.

3. An erecting device for gyroscopes of the vertical spin axis type, comprising in combination with such a gyroscope a magnet suspended with respect to the gyroscope as a universal pendulum, a conductor rotated by the gyroscope having a surface adjacent to which the pendulum magnet may swing and in which eddy currents are produced by the flux of the magnet as the conductor rotates, the axis of rotation of said conductor and the central axis of said magnet being in line when the gyroscope and magnet are in normal positions, said conductor having an opening in its surface at its axis of rotation for obtaining a greater than normal unbalance of the damping forces on opposite sides of the axis of rotation of the conductor when there is small axial displacement of the axes of conductor and magnet, said surface being further so shaped as to vary the average air gap between it and the magnet for progressively larger displacements of said axes, the opening in and shape of said conductor surface being such that the precessing rate of said device is substantially constant over its precessing range of operation.

4. An eddy current erecting device for gyroscopes of the vertical spin axis type comprising in combination with such a gyroscope a conductor symmetrical with the spin axis of said gyroscope and rotated by said gyroscope, a magnet supported as a universal pendulum with respect to said gyroscope to have an arc of swing adjacent to a surface of said conductor for the purpose of producing eddy currents therein as the conductor is rotated, the pendulous magnet having a normal position of rest symmetrical with the desired spin axis of the gyroscope when the eddy current damping forces on opposite sides of such axis are balanced, a central opening in the surface of said conductor dimensioned to intercept the flux from one side of said magnet and produce a greater than normal unbalance of the damping forces and a greater than normal erecting force for small angular displacements of the spin axis of the gyroscope, the remainder of the surface of said conductor being so shaped with respect to the arc of swing of the pendulous magnet as to vary the average air gap between such surface and magnet as to produce a substantially constant rate of erection for other displacements of the spin axis within the range of erection of the device.

5. In combination with a gyroscope of the vertical spin axis type for use on airplanes, an eddy current erecting device for said gyroscope comprising a member of conducting material symmetrically mounted on the spin axis of the gyroscope and rotated by said gyroscope and a magnet mounted as a universal pendulum with respect to the gyroscope to have a normal position of rest symmetrical with the spin axis of the gyroscope and a path of swing adjacent to a surface of said conductor so as to produce eddy currents therein, said erecting device having a normal position of rest such as to maintain the spin axis of the gyroscope tilted forward from the vertical by a small selected angle, said erecting device having a precessing rate which is substantially constant for different angular displacements of the magnet from the selected spin axis of the gyroscope and of a value, selected with respect to said selected angle of tilt, that erection errors due to banking turns of the ariplane at a given rate and corresponding displacements of the erecting magnet caused by such turns are compensated for.

6. In combination with a gyroscope of the vertical spin axis type for use on airplanes, an eddy current erecting device therefor comprising a member of conducting material symmetrically mounted with respect to the spin axis of the gyroscope and rotated by said gyroscope and a magnet mounted as a universal pendulum with respect to the gyroscope to have a normal position of rest symmetrical with the spin axis of the gyroscope and a path of swing adjacent to the surface of said conductor so as to produce eddy currents therein, said erecting device serving to normally erect the gyroscope so that its spin axis is tilted forward from the vertical by two and one-half degrees, said erecting device having a precessing rate which is substantially constant at eight degrees per minute for different angular displacements of the magnet from its normal position of rest over the effective range of operation, whereby erection errors due to airplane banking turns of 180 degrees per minute and corresponding displacement of the magnet caused by such turns are compensated for.

7. In combination with a universally pivoted gyroscope of the vertical spin axis type, an eddy current erecting device therefor comprising a conductor symmetrically disposed with respect to the spin axis of and rotated by the gyroscope, and a magnet mounted as a universal pendulum with respect to the gyroscope so as to have a normal position of rest symmetrical with the spin axis of the gyroscope and a path of swing adjacent to a surface of the conductor to produce eddy currents therein, said conductor surface conforming approximately to the shape of a sphere but having openings cut therein selected as to position and dimensions so as to obtain a substantially constant predetermined precessing rate for various angles of displacement of the magnet from its normal position of rest within the normal range of operation.

8. In combination with a gyroscope mounted for universal movement with respect to a given point, an erecting device therefor comprising a member rotated by the gyroscope on its spin axis and a member mounted as a universal pendulum relative to the gyroscope and having a normal correct erecting position symmetrical with the axis of spin of the gyroscope when the latter is in its correct position, said pendulum erecting member having a path of swing adjacent to the rotating erecting member, said erecting device being of a type in which the erecting precessing force is inversely proportional to the spacing between the rotating and pendulum members thereof, the point about which the gyroscope pivots being between the pendulum member and its point of universal support whereby when there is displacement between the correct positions of gyroscope and pendulum member the erecting force present with an incorrect angular displacement of the gyroscope is greater than the precessing force present with a similar incorrect angular displacement of the pendulum member.

9. In combination with a gyroscope of the type which is mounted for universal turning movement about a given point, an eddy current erecting device therefor comprising a conductor member symmetrical with respect to the spin axis of and rotated by the gyroscope, a magnet mounted as a universal pendulum having a normal position of rest symmetrical with respect to the spin axis of the gyroscope and having a path of swing adjacent to a surface of said conductor to produce eddy currents therein, the pivot point for said gyroscope being between the magnet and its pivot point whereby the air gap between the conductor surface and magnet is generally greater when the magnet swings out of correct position than it is when the gyroscope swings out of correct position.

10. In combination with a gyroscope of the vertical spin axis type, an eddy current erecting device therefor comprising a member symmetrical with the spin axis of the gyroscope and rotated thereby and a member mounted as a universal pendulum to swing beneath and adjacent to said other member and having a position of rest symmetrical with the desired spin axis of the gyroscope, one of said members being an eddy current conductor and the other a magnet for producing a flux in the eddy current conductor, said eddy current conductor being so shaped that when the pendulum member is displaced away from correct erecting position the precessing rate of the device is substantially constant for different displacements over the expected displacement range.

11. A torque exerting means for gyro verticals having a universally mounted rotor bearing case, a symmetrical cup-shaped conductor mounted for movement with the case, means for spinning the conductor about the axis of symmetry thereof, a radiator of magnetic energy pendulously supported on a universal mounting separate from that of the case but whose point of axial intersection is coincident with that of the universally mounted rotor bearing case, said radiator providing a reference axis for the rotor case that is normally coincident with the spin axis of the cup-shaped conductor, the cup-shaped conductor being so constructed that upon tilt thereof from the reference axis the total flux of the radiator passing through the conductor decreases as the magnitude of the displacement increases.

12. Means for exerting an erecting torque about the axes of universal mounting of the rotor case of a gyro vertical comprising a radiator of magnetic energy, pendulously mounted on a separate universal support, providing a reference axis for the rotor case, a conductor linking the flux of the radiator mounted for movement with the rotor case, means for spinning said conductor about an axis normally coincident with the reference axis of the radiator, said conductor being symmetrically shaped with reference to its spin axis and being so constructed in configuration and disposed with respect to the radiator that after initial angular displacement of the conductor and radiator, an erecting torque of substantially constant magnitude is exerted on the case.

RICHARD G. JEWELL.

REFERENCES CITED

The following references are of record in the file of this patent:

UNITED STATES PATENTS

| Number | Name | Date |
| --- | --- | --- |
| 1,310,862 | Gray | July 22, 1919 |
| 1,442,799 | Gray | Jan. 23, 1923 |
| 2,339,606 | Sias | Jan. 18, 1944 |
| 2,268,011 | Beechlyn | Dec. 30, 1941 |

FOREIGN PATENTS

| Number | Country | Date |
| --- | --- | --- |
| 317,946 | Italian | May 28, 1934 |
| 359,071 | British | Mar. 6, 1931 |
| 760,535 | French | Dec. 14, 1933 |
| 442,442 | British | Feb. 7, 1936 |
| 488,875 | British | July 15, 1938 |